US009420738B2

(12) United States Patent
Walter

(10) Patent No.: US 9,420,738 B2
(45) Date of Patent: Aug. 23, 2016

(54) LOW RATE METERING WHEEL FOR COARSE GRANULES

(71) Applicant: AGCO Corporation, Hesston, KS (US)

(72) Inventor: Mark Walter, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 55 days.

(21) Appl. No.: 14/299,475

(22) Filed: Jun. 9, 2014

(65) Prior Publication Data

US 2014/0367413 A1    Dec. 18, 2014

Related U.S. Application Data

(60) Provisional application No. 61/834,141, filed on Jun. 12, 2013.

(51) Int. Cl.
*A01C 7/12*        (2006.01)
*A01C 7/08*        (2006.01)

(52) U.S. Cl.
CPC ....... *A01C 7/127* (2013.01); *A01C 7/081* (2013.01)

(58) Field of Classification Search
CPC ................................ A01C 7/127; A01C 7/081
USPC ........... 222/274, 71, 410, 414, 367, 368, 394; 111/177, 178
See application file for complete search history.

(56) References Cited

U.S. PATENT DOCUMENTS

| 363,604 | A | * | 5/1887 | Crane | A01C 7/087 222/268 |
|---|---|---|---|---|---|
| 528,037 | A | * | 10/1894 | Seiberth | F23K 3/14 222/234 |
| 1,864,294 | A | * | 6/1932 | Cady | A01C 7/12 222/274 |
| 2,551,853 | A | * | 5/1951 | Schill | A01C 7/125 222/226 |
| 5,924,370 | A | * | 7/1999 | Gregor | A01C 7/12 111/174 |
| 6,158,630 | A | * | 12/2000 | Mayerle | G01F 13/001 222/413 |
| 6,240,861 | B1 | * | 6/2001 | Memory | A01C 7/20 111/178 |
| 6,928,940 | B2 | * | 8/2005 | Soun | A01C 7/06 111/178 |
| 8,132,521 | B2 | * | 3/2012 | Snipes | A01C 7/127 111/178 |
| 8,931,424 | B2 | * | 1/2015 | Friggstad | A01C 7/125 111/178 |
| 2005/0263052 | A1 | * | 12/2005 | Pleyer | A01C 7/081 111/177 |

* cited by examiner

*Primary Examiner* — Donnell Long

(57) ABSTRACT

A metering wheel includes a shaft having a longitudinal axis, a plurality of first wheel sections, and a plurality of second wheel sections. Each first wheel section has a fluted exterior surface and is rotatably coupled to the shaft. Each second wheel section has a cylindrical exterior surface and is co-axial with the shaft and rotatable independently of the shaft. In another aspect, at least one of the plurality of first wheel sections has a plurality of protrusions on the exterior surface defining a plurality of valleys therebetween, wherein at least one protrusion does not extend an axial length of the first section. In yet another aspect, a metering assembly comprises a metering wheel and a chute divider. The chute divider comprises a wall positioned proximate a longitudinal mid-point of one of the plurality of first sections or one of the plurality of second sections.

8 Claims, 6 Drawing Sheets

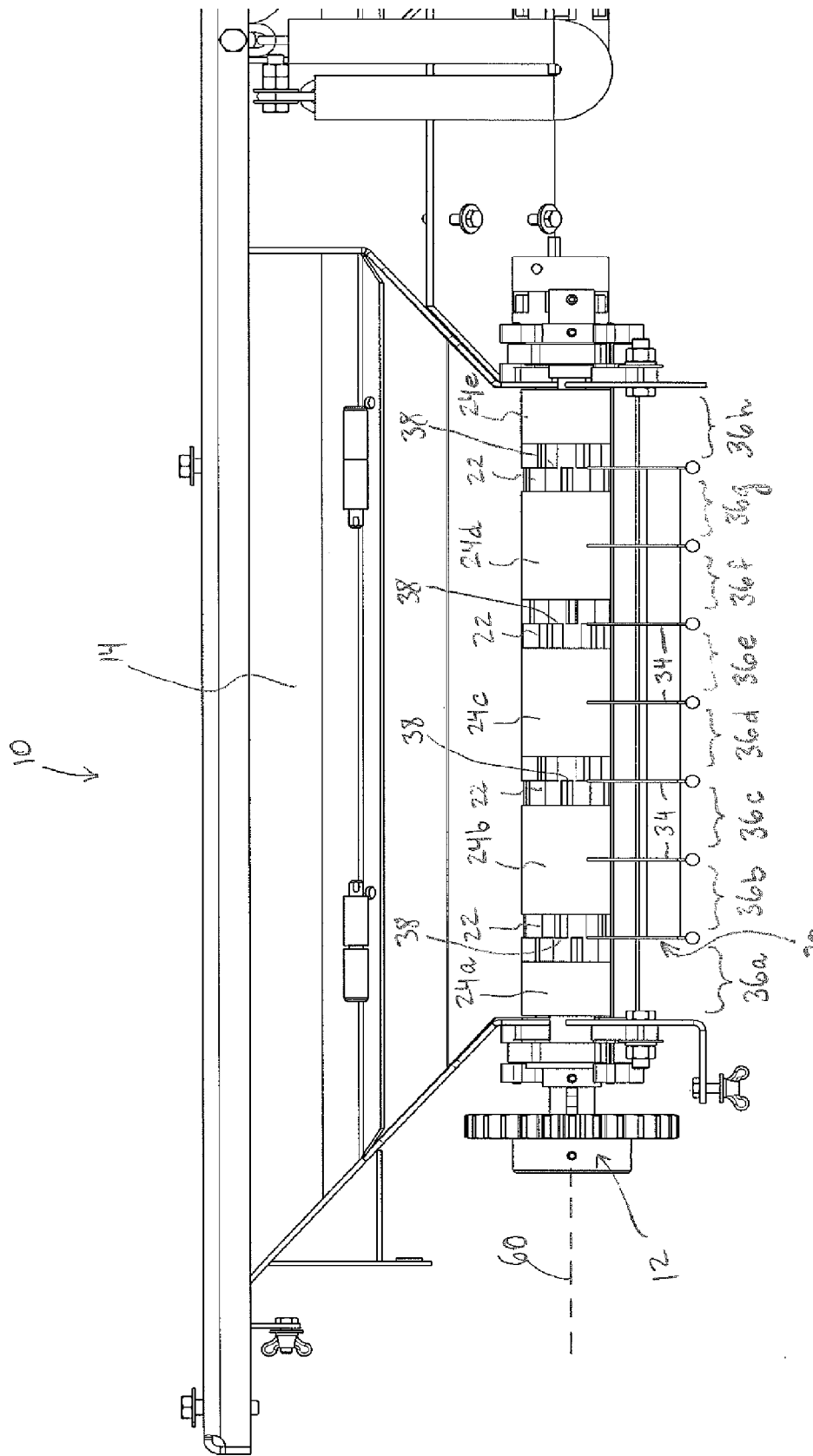

LOW RATE METERING WHEEL FOR COARSE GRANULES

BACKGROUND

In modern agricultural seeding operations, a tractor typically pulls a plurality of furrow cutting and seeding units across a field to plant multiple rows of seeds simultaneously. Each row unit is designed to open a seed furrow, deposit seeds within the seed furrow, and close the seed furrow around the seeds by moving the displaced dirt back into the furrow.

An air seeder is commonly used in automated planting operations. The air seeder carries seed, fertilizer and possibly other chemicals in one or more reservoirs in communication with a pneumatic conveyance system. The pneumatic conveyance system uses air flow at such a velocity that the seeds and/or fertilizer are entrained into the air stream and are thereby conveyed through a seed tube or other tubes. Metering mechanisms control the flow of seed and fertilizer to the pneumatic conveyance system to control the rate of application of seed and fertilizer to the ground.

In a standard metering system, a fluted cylinder is provided, having valleys between raised ridges. Particles to be metered out from a reservoir are carried in the valleys as the cylinder rotates about a horizontal axis. The dimensions of the valleys are generally much larger than the size of the granules to be metered in order to ensure smooth operation. The valleys are generally spaced uniformly around the cylinder and along a length of the cylinder to distribute granules evenly from the granular distribution system (e.g., hopper). The metering cylinder can be a single unit or can be made of a horizontal stack of cylindrical elements. The number and size of valleys on a given metering cylinder determines the volume of granules metered per revolution of the cylinder. Where a low metering rate is desired, it is conventional to use a metering cylinder having smaller valleys to reduce the volume metered per revolution.

However, certain particles, such as metal granules used as micronutrient fertilizers, for example, are larger in size than the relatively small valleys of conventional "low rate" metering cylinders. If a larger size granule does not fit in a valley and therefore extends out of the valley, the large granule can contact the fixed surfaces of the metering mechanism against which the cylinder rotates. Such contact can damage the granule, potentially compromising the granule's effectiveness as seed, fertilizer, etc. If a large granule is too hard to crush, the cylinder will bind as it rotates, leading to excess torque load on the metering mechanism.

A metering cylinder with larger valleys uniformly spaced across the cylinder would allow granules to fit into the cylinder with room to move in response to contact with the fixed surfaces of the metering mechanism. However, use of a metering cylinder with larger valleys increases the volume metered per revolution, therefore not meeting a "low rate" per revolution requirement.

Accordingly, the present disclosure describes embodiments of an apparatus and method for metering seed or other particles from a hopper. The disclosed concepts are suitable for "low rate" metering of relatively large particles.

SUMMARY

In one aspect, a metering wheel comprises a shaft having a longitudinal axis, a plurality of first wheel sections, and a plurality of second wheel sections. Each first wheel section has a fluted exterior surface and is rotatably coupled to the shaft. Each second wheel section has a cylindrical exterior surface and is co-axial with the shaft and rotatable independently of the shaft.

In another aspect, a metering wheel comprises a shaft having a longitudinal axis, a plurality of first wheel sections, and a plurality of second wheel sections. Each first wheel section has a fluted exterior surface and is rotatably coupled to the shaft, wherein at least one of the plurality of first wheel sections has a plurality of protrusions on the exterior surface defining a plurality of valleys therebetween, and wherein at least one protrusion does not extend an axial length of the first section. Each second wheel section has a cylindrical exterior surface and is co-axial with the shaft.

In yet another aspect, a metering assembly comprises a metering wheel and a chute divider. The metering wheel comprises a shaft having a longitudinal axis, a plurality of first wheel sections, and a plurality of second wheel sections. Each first wheel section has a fluted exterior surface and is rotatably coupled to the shaft. Each second wheel section has a cylindrical exterior surface and is co-axial with the shaft. The chute divider comprises a wall positioned proximate a longitudinal mid-point of one of the plurality of first sections or one of the plurality of second sections.

This disclosure, in its various combinations, may also be characterized by the following listing of items:

1. A metering wheel comprising:
   a shaft having a longitudinal axis;
   a plurality of first wheel sections, each first wheel section having a fluted exterior surface and being rotatably coupled to the shaft; and
   a plurality of second wheel sections, each second wheel section having a cylindrical exterior surface and being co-axial with the shaft and rotatable independently of the shaft.
2. The metering wheel of item 1 wherein at least a first portion of the shaft has a non-circular cross-sectional configuration and wherein at least one of the plurality of first wheel sections has a bore with the non-circular cross-sectional configuration.
3. The metering wheel of any of items 1-2 wherein each first wheel section is axially aligned next to a second wheel section on the shaft.
4. The metering wheel of any of items 1-3 wherein each second wheel section is axially aligned next to a first wheel section on the shaft.
5. The metering wheel of any of items 1-4 wherein at least one of the plurality of first sections has a plurality of protrusions on the exterior surface defining a plurality of valleys therebetween, wherein at least one protrusion does not extend an axial length of the first section.
6. The metering wheel of item 5 wherein at the least one protrusion extends about half an axial length of the first section.
7. The metering wheel of any of items 1-6 wherein at least two of the plurality of second sections have different axial lengths.
8. A metering wheel comprising:
   a shaft having a longitudinal axis;
   a plurality of first wheel sections, each first wheel section having a fluted exterior surface and being rotatably coupled to the shaft, wherein at least one of the plurality of first wheel sections has a plurality of protrusions on the exterior surface defining a plurality of valleys therebetween, and wherein at least one protrusion does not extend an axial length of the first section; and a plurality of second wheel sections, each second wheel section having a cylindrical exterior surface and being co-axial with the shaft.

9. The metering wheel of item 8 wherein the at least one protrusion extends about half an axial length of the first section.

10. The metering wheel of any of items 8-9 wherein at least two of the plurality of second sections have different axial lengths.

11. The metering wheel of any of items 8-10 wherein:
at least a first portion of the shaft has a non-circular cross-sectional configuration;
at least one of the plurality of first wheel sections has a bore with the non-circular cross-sectional configuration; and
at least one of the plurality of second wheel sections is co-axial with the shaft and rotatable independently of the shaft.

12. The metering wheel of any of items 8-11 wherein each first wheel section is axially aligned next to a second wheel section on the shaft.

13. The metering wheel of any of items 8-12 wherein each second wheel section is axially aligned next to a first wheel section on the shaft.

14. A metering assembly comprising:
a metering wheel comprising:
  a shaft having a longitudinal axis;
  a plurality of first wheel sections, each first wheel section having a fluted exterior surface and being rotatably coupled to the shaft;
  a plurality of second wheel sections, each second wheel section having a cylindrical exterior surface and being co-axial with the shaft; and
a chute divider comprising a wall positioned proximate a longitudinal mid-point of one of the plurality of first sections or one of the plurality of second sections.

15. The metering assembly of item 14 wherein:
at least a first portion of the shaft has a non-circular cross-sectional configuration;
at least one of the plurality of first wheel sections has a bore having the non-circular cross-sectional configuration; and
at least one of the plurality of second sections is rotatable independently of the shaft.

16. The metering assembly of any of items 14-15 wherein each first wheel section is axially aligned next to a second wheel section on the shaft.

17. The metering assembly of any of items 14-16 wherein each second wheel section is axially aligned next to a first wheel section on the shaft.

18. The metering assembly of any of items 14-17 wherein at least one of the plurality of first sections has a plurality of protrusions on the exterior surface defining a plurality of valleys therebetween, wherein at least one protrusion does not extend an axial length of the first section.

19. The metering assembly of item 18 wherein the at least one protrusion extends about half an axial length of the first section.

20. The metering assembly of any of items 14-19 wherein at least two of the plurality of second sections have different axial lengths.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 6 is a partial rear elevation view of the assembly of FIG. 1.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

To reduce the volume of metered granules compared to a standard metering cylinder, a plurality of fluted cylinder sections are positioned among a plurality of blank cylinder sections in an alternating arrangement. In an exemplary embodiment, the fluted cylinder sections are mated to a metering shaft so that they rotate directly with the shaft. In one embodiment, the blank cylinder sections are mated in a similar fashion on the metering shaft for rotation directly with the shaft and the fluted cylinder sections. In another embodiment, the blank cylinder sections are assembled onto the shaft so that they may rotate freely, rather than fixedly with the shaft. The ability to rotate freely may further reduce the probability that parts of the assembly bind when the metering cylinder rotates relative to other components of the metering mechanism.

Figure 1:
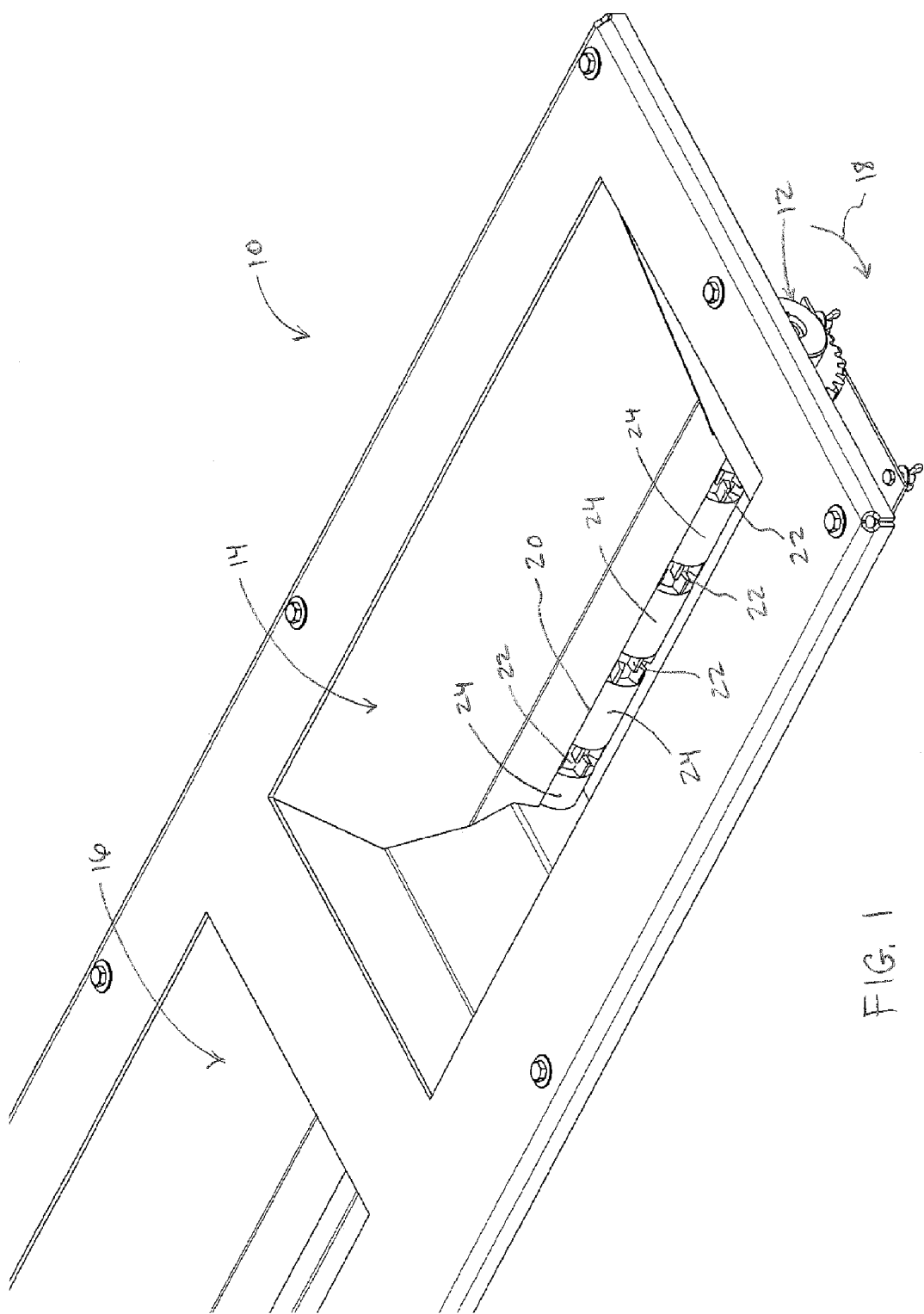
FIG. 1 is a partial perspective front and top view of a hopper assembly incorporating an exemplary embodiment of a metering wheel of the present disclosure.

FIG. 1 is a partial perspective front and top view of a hopper assembly 10 incorporating an exemplary embodiment of a metering cylinder or metering wheel 12 of the present disclosure. While no particulate product is illustrated, it is to be understood that such product in use would be contained in the hoppers and flow downward therefrom. The product would flow onto the disclosed metering wheel as the wheel rotates. The wheel thereby controls the flow rate of the product from the hopper. In an exemplary embodiment, the metering wheel assembly also distributes the product along a length of the cylinder and divides the product flow into separate product flow streams.

Figure 2:
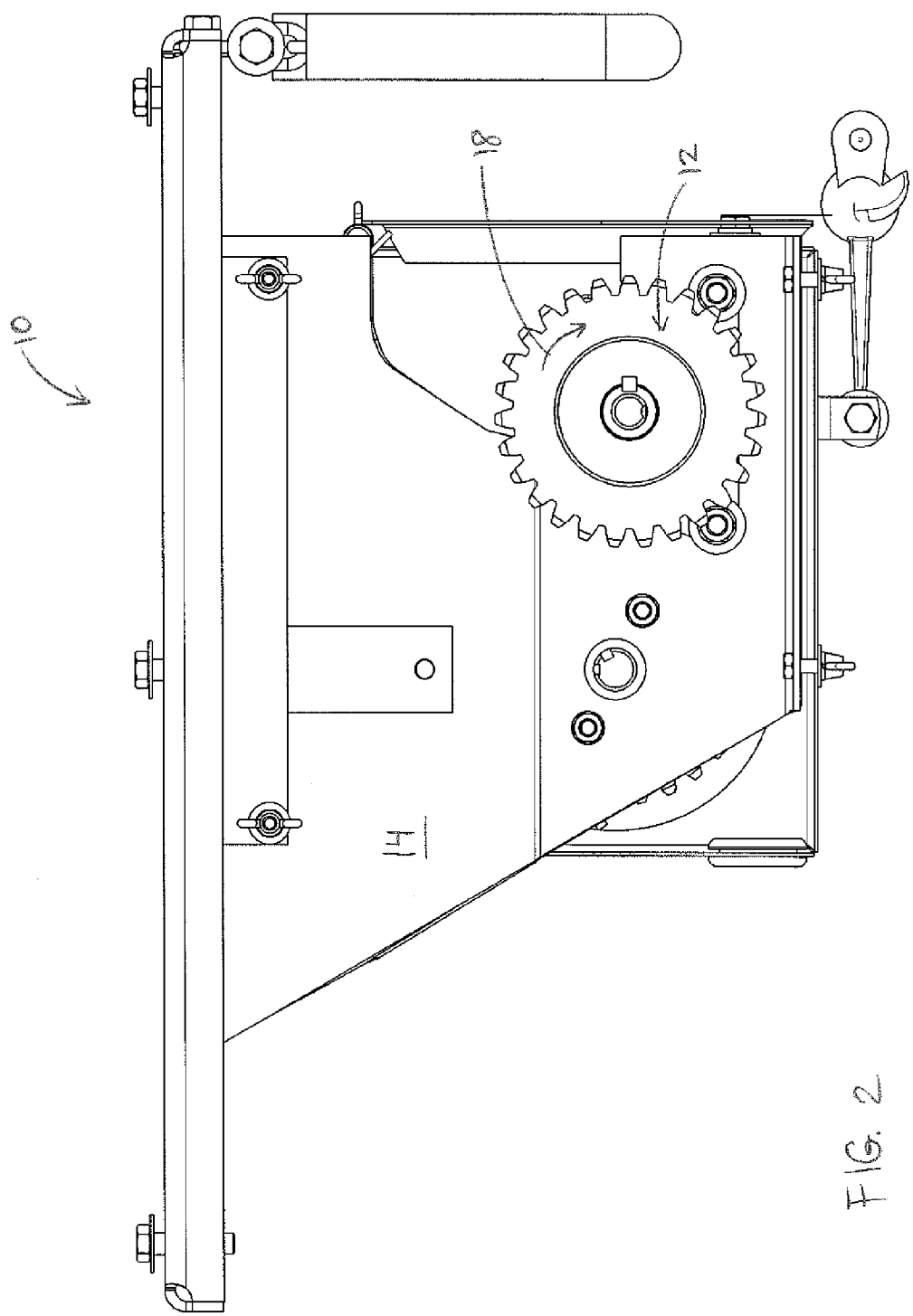
FIG. 2 is a side elevation view of the assembly of FIG. 1.

In an exemplary embodiment, hopper assembly 10 includes a first hopper 14 and a second hopper 16, each with its own metering wheel 12. Only one of the metering wheels 12 will be discussed in detail. It is to be understood that the metering wheel for other hoppers can be similar. In a typical method of use, metering wheel 12 rotates in direction 18, as shown in FIGS. 1 and 2. First hopper 14 conventionally has a bottom edge 20 on which large granules carried by a conventional low-rate metering wheel can catch and bind as the wheel rotates.

Figure 4:
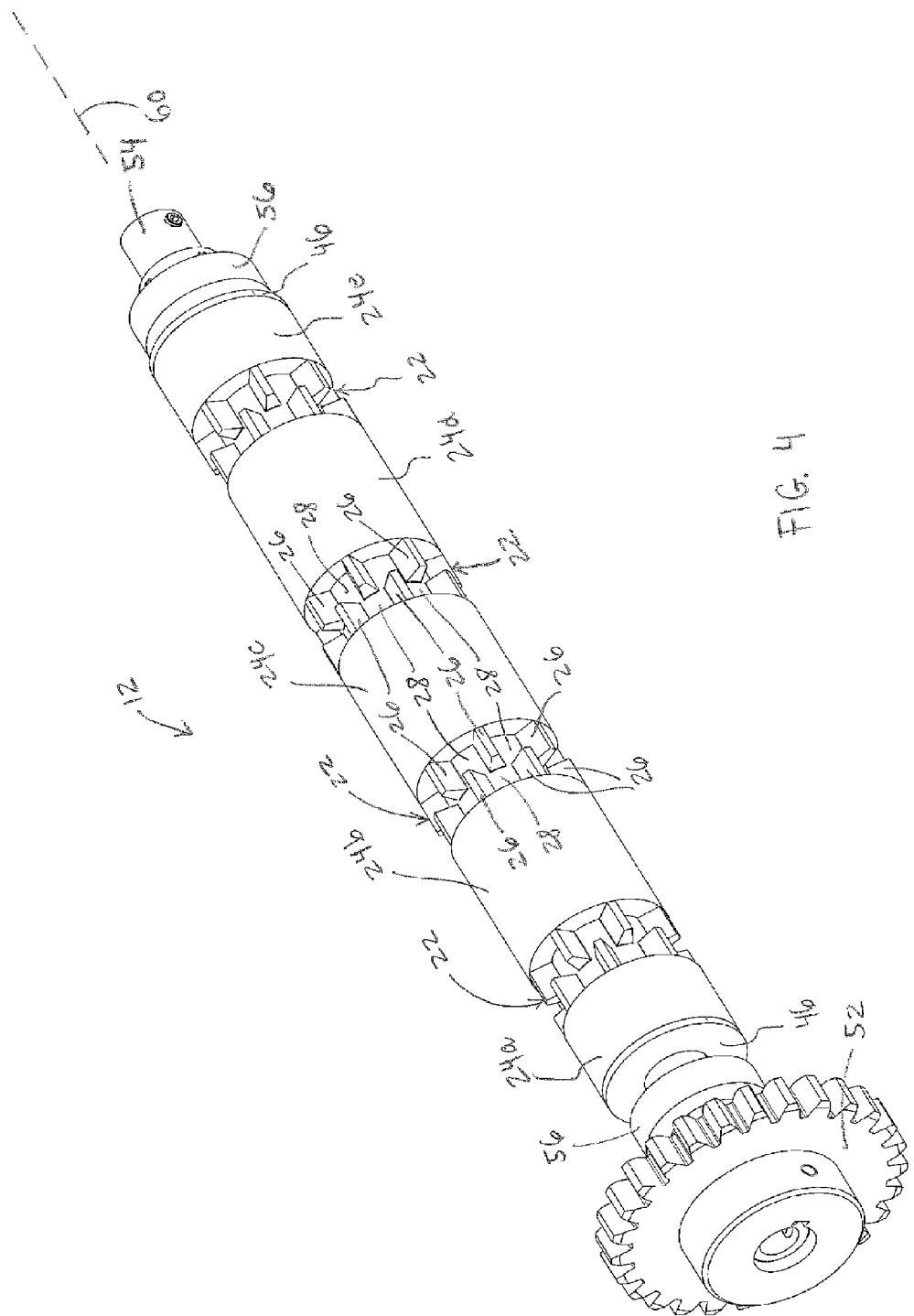
FIG. 4 is a perspective view of the metering wheel, removed from the assembly of FIG. 1.

However, the disclosed metering wheel 12 has features that prevent such binding. In an exemplary embodiment, metering wheel 12 includes a plurality of fluted cylinder sections 22 alternatingly interspaced with a plurality of blank cylinder sections 24. As shown in FIG. 4, each of the fluted cylinder sections 22 has a fluted exterior surface including raised protrusions 26 extending radially outward, defining valleys 28 between adjacent protrusions 26. Each of the valleys 28 is sized to accommodate relatively large granules, thereby preventing binding of the metering assembly if the granule contacts edge 20 or other components of hopper assembly 10. Each of blank cylinder sections 24 has a cylindrical exterior surface. The blank cylinder sections 24 block off corresponding areas of metering wheel 12 from accepting particles, thereby reducing the volume of particles metered with each revolution of metering wheel 12.

Figure 3:
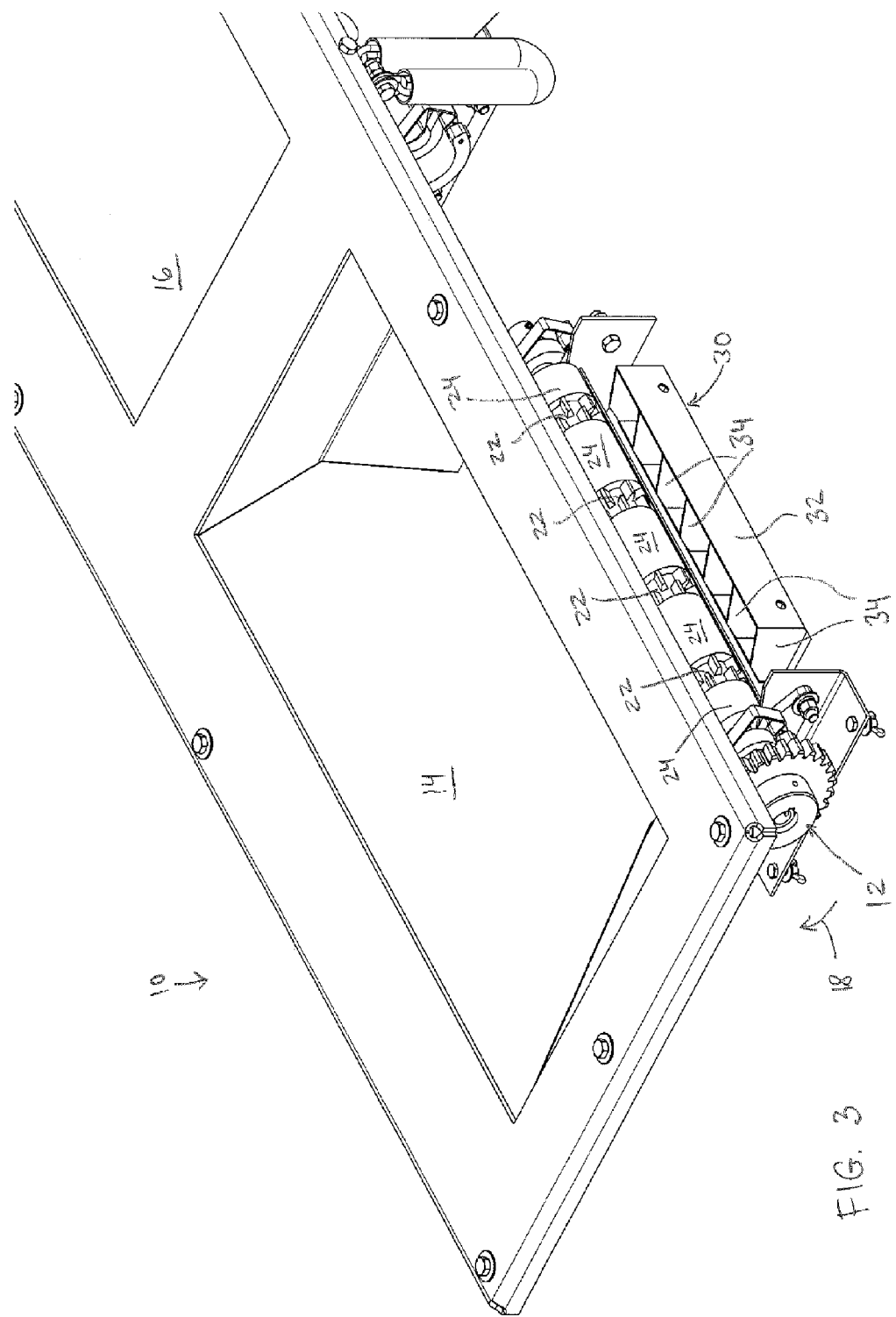
FIG. 3 is a partial perspective rear and top view of the hopper assembly of FIG. 1.

As shown in FIG. 3, a chute divider 30 having a shield 32 and a plurality of walls 34 is provided downstream of metering wheel 12. In FIG. 6, the shield is removed for clarity. In an exemplary embodiment, selected walls 34 of divider 30 separate the product flowing off metering wheel 12 into a plurality of equal streams (e.g., eight streams), for direction to a like number of seed tubes (not shown). While eight streams are illustrated, it is understood that a divider may be provided to separate the product flow into more or fewer streams. As shown in FIG. 6, the alternating fluted cylinder sections 22 and blank cylinder sections 24 are positioned so that each of streams 36a-36h receives the same amount of product. Shims, such as those similar to shims 46 shown in FIGS. 4 and 5, may be used along a length of metering wheel 20 as needed to ensure proper positioning of fluted cylinder sections 22 and blank cylinder sections 24 with respect to chute divider 30.

In an exemplary embodiment as shown, each divider wall 34 is positioned proximate a longitudinal mid-point of either a fluted cylinder section 22 or a blank cylinder section 24 along longitudinal axis 60 of shaft 42. Accordingly, each of the streams 36a-36h receives product fed through a portion of metering wheel 12 that includes half of a fluted cylinder section 22 and half of a blank cylinder section 24. In the illustrated embodiment, each of the end blank cylinder sections 24a and 24e is half the length of each of the intermediate blank cylinder sections 24b, 24c and 24d. Thus, the end blank cylinder sections 24a and 24e have a different axial length than the intermediate blank cylinder sections 24b, 24c and 24d. In the illustrated embodiment, each of fluted cylinder sections 22 has a break in the pattern of protrusions 26 and valleys 28 at a longitudinal mid-point 38 to facilitate the separation of adjacent streams 36a-36h. In such an embodiment, each of the protrusions 26 extends about half the axial length of the fluted cylinder section 22. However, it is to be understood that other configurations of fluted cylinder sections 22 and blank cylinder sections 24, individually or as an assembly, are possible.

Figure 5:
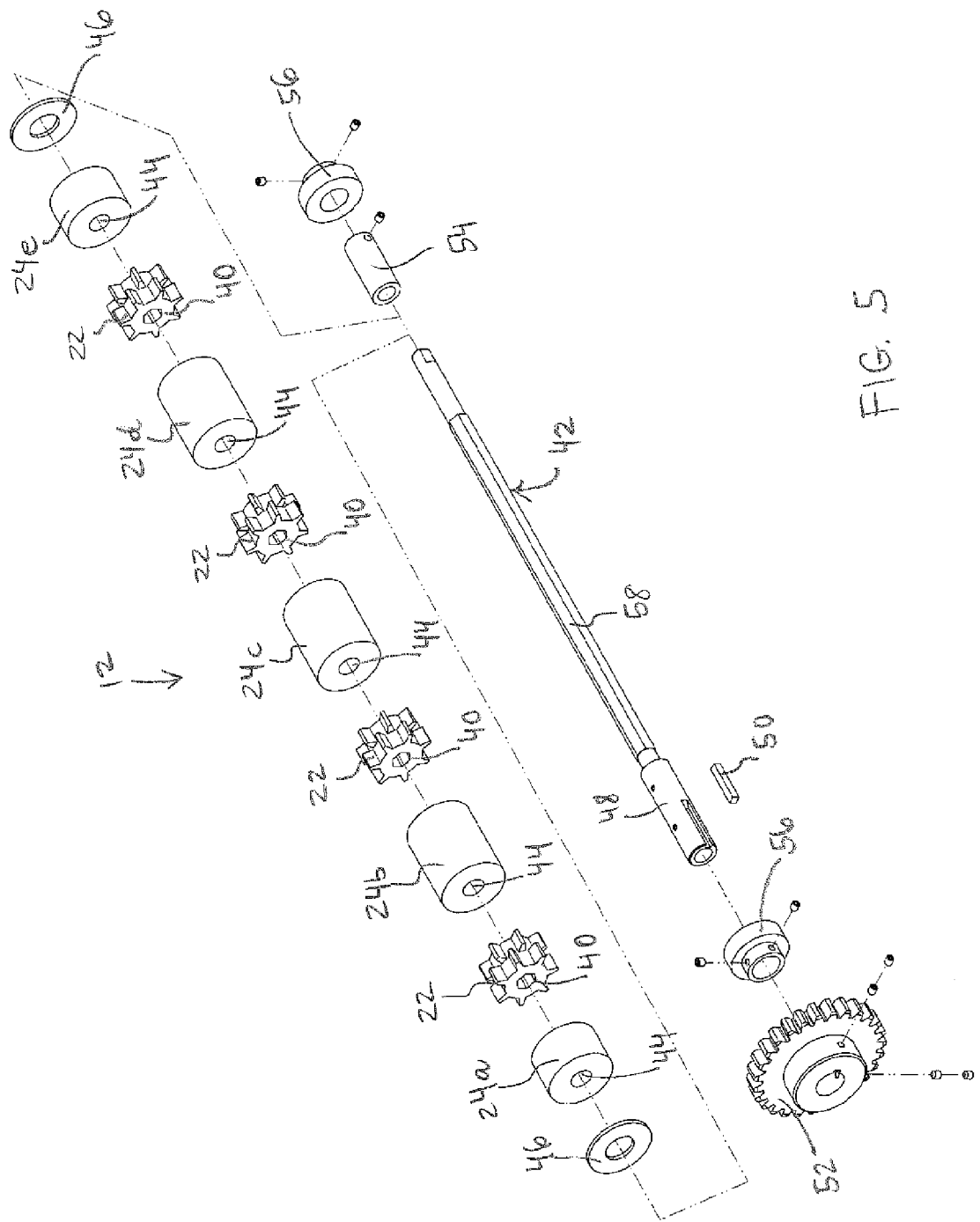
FIG. 5 is an exploded perspective view of the metering wheel of FIG. 4.

FIG. 5 is an exploded perspective view of metering wheel 12. In an exemplary embodiment, each of the fluted cylinder sections 22 and the blank cylinder sections 24 is alternately positioned on shaft 42. Each fluted cylinder section 22 is axially aligned next to a blank cylinder section 24. Similarly, each blank cylinder section 24 is axially aligned next to a fluted cylinder section 22. In an exemplary embodiment, each of fluted cylinder sections 22 is configured with an aperture 40 to mate with shaft 42 to rotate therewith. In an exemplary embodiment, shaft 42 has a portion 58 with a non-circular cross-sectional configuration. In the illustrated embodiment, each aperture 40 is a hexagonal bore to match and mate with a hexagonal portion 58 of shaft 42. However, it is to be understood that other configurations of mating apertures and shafts are also possible, particularly non-circular configurations. Each of the fluted cylinder sections 22 is rotatably coupled to shaft 42 to rotate therewith as shaft 42 turns with gear 52. In an exemplary embodiment, each of blank cylinder sections 24 includes an aperture 44 configured to accept shaft 42 so that the blank cylinder section 24 is co-axial with shaft 42. In the illustrated embodiment, each of apertures 44 is a circular bore that allows a blank cylinder section 24 to freely rotate on shaft 42 (e.g., blank cylinder section 24 is able to rotate independently of shaft 42).

In the illustrated embodiment, shims 46 are provided on each end of the assembly of fluted cylinder sections 22 and blank cylinder sections 24. However, shims may also be provided elsewhere as desired to achieve particular spacing configurations. In the illustrated embodiment, metering wheel 12 includes an anti-seize sleeve 48, including a key 50, proximate driven gear 52. The other end of metering wheel 12 includes shaft sleeve 54. Bearing collars 56 are provided on both ends of metering wheel 12. In an exemplary embodiment, the described components are fastened together using conventional adhesive and mechanical fasteners, such as adhesive sealants and screws. Shaft 42, with fluted cylinder sections 22 and blank cylinder sections 24 mounted thereon, rotates with gear 52.

While a metering wheel 12 including an assembly of a plurality of alternating fluted cylinder sections 22 and blank cylinder sections 24 is shown, it is contemplated that a metering wheel having similar exterior features can be formed as a unitary, one-piece cylinder.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:
1. A metering assembly comprising:
   a metering wheel comprising:
      a shaft having a longitudinal axis;
      a plurality of first wheel sections, each first wheel section having a fluted exterior surface and being rotatably coupled to the shaft;
      a plurality of second wheel sections, each second wheel section having a cylindrical exterior surface and being co-axial with the shaft, the plurality of second wheel sections and plurality of first wheel sections configured along the longitudinal axis of the shaft in an alternating relationship; and
   a chute divider positioned downstream of metering wheel, the chute divider comprising a plurality of walls along the longitudinal axis of the shaft so as to separate product flowing off the metering wheel into a plurality of equal streams, with each wall of the plurality of walls positioned proximate either a longitudinal mid-point of one of the plurality of first sections or one of the plurality of second sections such that each stream of the plurality of streams receives product fed through a portion of the metering wheel that includes half of one of the plurality of first wheel sections and half of one of the plurality of second wheel sections.

2. The metering assembly of claim 1 wherein at least one of the plurality of first wheel sections has a plurality of protrusions on the exterior surface defining a plurality of valleys therebetween, wherein at least one protrusion does not extend an axial length of the first wheel section.

3. The metering assembly of claim 2 wherein each of the at least one protrusions extend about half an axial length of the at least one first wheel section, and adjacent protrusions around the circumference of the first wheel section are offset, such that each of first wheel sections has a break in the pattern of protrusions and valleys at a longitudinal mid-point to facilitate the separation of adjacent streams.

4. The metering assembly of claim 1 wherein at least two of the plurality of second sections have different axial lengths such that each of the second wheel sections positioned at an outer end of the shaft have a length that is half the length of each of the second wheel sections positioned intermediate the second wheel sections at the outer ends.

5. A metering assembly comprising:
   a metering wheel comprising:
      a shaft having a longitudinal axis wherein at least a first portion of the shaft has a non-circular cross-sectional configuration;
      a plurality of first wheel sections, each first wheel section having a fluted exterior surface and being rotatably coupled to the shaft, wherein at least one of the plurality of first wheel sections has a bore having the non-circular cross-sectional configuration;
      a plurality of second wheel sections, each second wheel section having a cylindrical exterior surface and being co-axial with the shaft, wherein at least one of the plurality of second sections is rotatable independently of the shaft; and
   a chute divider comprising a wall positioned proximate a longitudinal mid-point of one of the plurality of first sections or one of the plurality of second sections.

6. The metering assembly of claim 5 wherein each first wheel section is axially aligned next to a second wheel section on the shaft.

7. The metering assembly of claim 5 wherein each second wheel section is axially aligned next to a first wheel section on the shaft.

8. The metering assembly of claim 5 wherein the chute divider is positioned downstream of metering wheel, the chute divider comprising a plurality of walls along the longitudinal axis of the shaft so as to separate product flowing off the metering wheel into a plurality of equal streams, with each wall of the plurality of walls positioned proximate either a longitudinal mid-point of one of the plurality of first sections or one of the plurality of second sections such that each stream of the plurality of streams receives product fed through a portion of the metering wheel that includes half of one of the plurality of first wheel sections and half of one of the plurality of second wheel sections.

* * * * *